United States Patent
Mori et al.

[11] Patent Number: 5,954,955
[45] Date of Patent: Sep. 21, 1999

[54] OIL-WATER RECOVERING AND SEPARATING APPARATUS

[75] Inventors: Yoji Mori; Isao Mori; Masami Hashimoto, all of Misato, Japan

[73] Assignee: World Chemical Co., LTD., Tokyo, Japan

[21] Appl. No.: 08/826,406

[22] Filed: Mar. 24, 1997

[30] Foreign Application Priority Data

Jun. 21, 1996 [JP] Japan .................................. 8-181625
Jul. 18, 1996 [JP] Japan .................................. 8-207924

[51] Int. Cl.⁶ .............................. C02F 1/24; B01D 17/035
[52] U.S. Cl. .................. 210/221.2; 210/205; 210/221.1; 210/256; 210/260; 210/295; 210/298; 210/523; 210/528
[58] Field of Search ................................ 210/703, 221.2, 210/DIG. 5, 256, 260, 221.1, 205, 523, 528, 298, 295

[56] References Cited

U.S. PATENT DOCUMENTS

| | | |
|---|---|---|
| 2,695,710 | 11/1954 | Gibbs . |
| 2,779,731 | 1/1957 | Kelly . |
| 2,983,677 | 5/1961 | Boyd . |
| 3,443,694 | 5/1969 | Malinovsky . |
| 3,733,272 | 5/1973 | Burns . |
| 4,043,912 | 8/1977 | Bascope . |
| 4,049,553 | 9/1977 | Stebbins . |
| 4,240,908 | 12/1980 | Swain . |
| 4,255,262 | 3/1981 | O'Chesky . |
| 4,411,791 | 10/1983 | Ward . |
| 5,080,802 | 1/1992 | Cairo . |
| 5,120,435 | 6/1992 | Fink . |
| 5,509,779 | 4/1996 | Mori et al. . |

*Primary Examiner*—Thomas M. Lithgow
*Attorney, Agent, or Firm*—Oliff & Berridge, PLC

[57] ABSTRACT

An oil-water recovering and separating apparatus for separating a raw fluid consisting of a mixture of oil and water into an oil part and a water part on the basis of difference in specific gravity, comprising: intake means for taking in the recovered raw fluid; a separation tank for separating the taken-in raw fluid; a water-part reservoir tank continued to the separation tank; a drain tank continued to the water-part reservoir tank; an oil part recovery portion disposed in the separation tank, the oil part recovery portion having a recovery port disposed slightly above the fluid level of the raw fluid in the separation tank; and scrape-up means provided in a position facing the recovery port so as to move along the fluid level.

11 Claims, 15 Drawing Sheets

F I G. 13
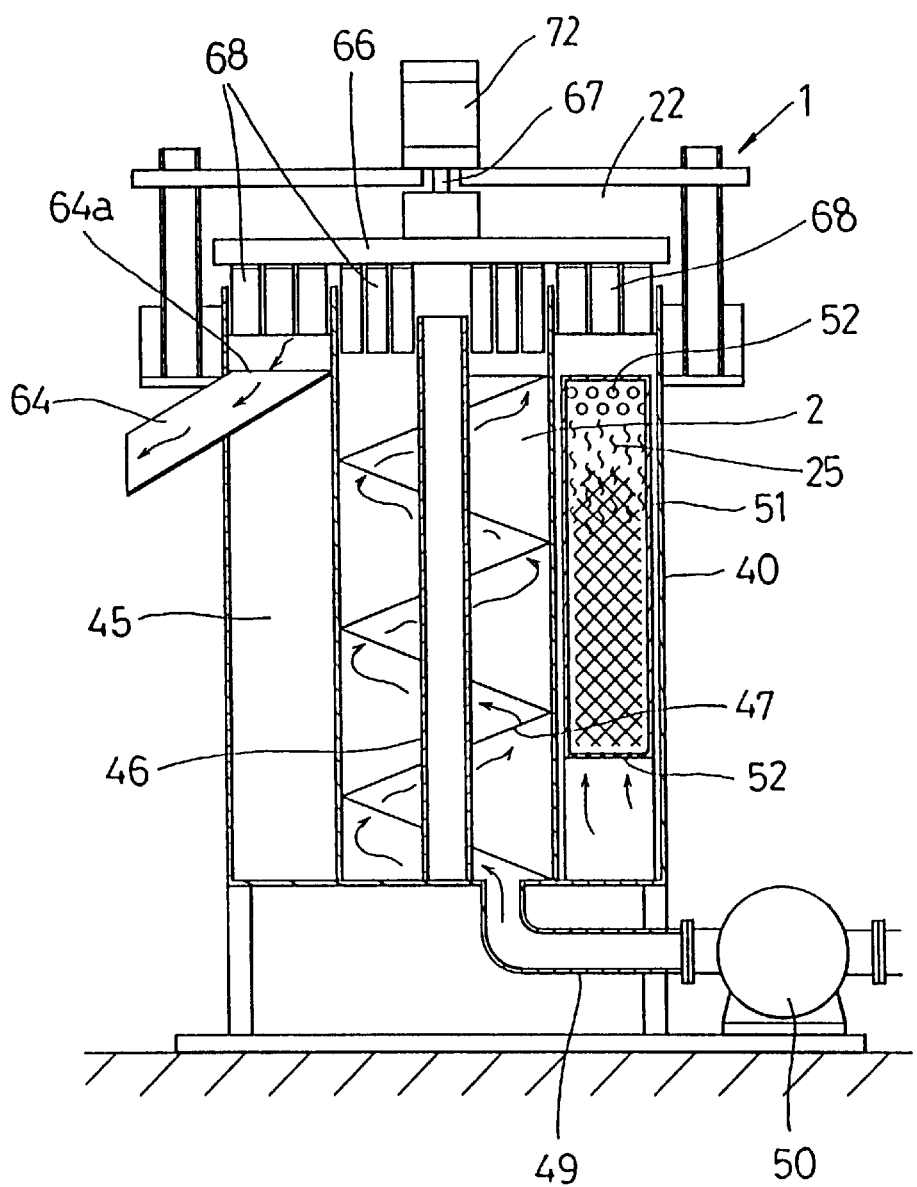

OIL-WATER RECOVERING AND SEPARATING APPARATUS

BACKGROUND OF THE INVENTION

1. Field of the Invention

The present invention relates to an oil-water recovering and separating apparatus for efficiently separating oil and water from a raw fluid in which oil and water are mixed and for removing a floating solid matter and a viscous oil part from the raw fluid.

2. Description of the Related Art

Conventionally, in a food factory, animal and vegetable oil is mixed in waste water so as to float up. Accordingly, it is necessary to separate oil and water from each other through an oil-water recovering and separating apparatus to recover an oil part. As oil-water recovering and separating apparatuses of this type, there are a lot of apparatuses using difference in specific gravity between oil and water to separate oil and water from each other.

Incidentally, the oil part separated and floated contains viscous oil part. Consequently, it is difficult to recover such viscous oil part because the viscous oil part remains in the neighborhood of the opening in the upper portion of the recovery portion.

SUMMARY OF THE INVENTION

The present invention is designed to solve the aforementioned problem and an object thereof is to provide an oil-water recovering and separating apparatus in which not only oil and water are separated from each other efficiently, but also viscous oil part and solid impurities such as scum, foreign matter, etc., mixed in the separated oil part can be recovered securely.

In order to achieve the above object, according to a first aspect of the present invention, provided is an oil-water recovering and separating apparatus for separating a raw fluid consisting of a mixture of oil and water into an oil part and a water part on the basis of difference in specific gravity, comprising: intake means for taking in the recovered raw fluid; a separation tank for separating the taken-in raw fluid; a water-part reservoir tank continued to the separation tank; a drain tank continued to the water-part reservoir tank; an oil part recovery portion disposed in the separation tank, the oil part recovery portion having a recovery port disposed slightly above the fluid level of the raw fluid in the separation tank; and scrape-up means provided in a position facing the recovery port so as to move along the fluid level.

In the above oil-water recovering and separating apparatus, preferably, a plurality of circular arc-shaped guide means for generating a rotating flow in the taken-in raw fluid is provided on a head end side of the separation tank, and an inclined ceiling is attached to the separation tank so that the downstream side in the direction of flow of the raw fluid becomes higher gradually.

In the above oil-water recovering and separating apparatus, preferably, a plurality of circular arc-shaped guide means for generating a rotating flow of the raw fluid are provided on the head end side of the separation tank so as to be opposite to each other while the positions of the circular arc-shaped guide means displaced vertically from each other.

In the above oil-water recovering and separating apparatus, preferably, the inclined ceiling attached to the separation tank is shaped like a single-flow roof or a double-flow roof.

In the above oil-water recovering and separating apparatus, preferably, the raw fluid intake means is formed so as to send the received raw fluid mixed with air to the separation tank in a state as it is or in a state after removal of mixed air.

In the above oil-water recovering and separating apparatus, preferably, a whisker net formed from metal whiskers in the form of a net is provided in the separation tank or in the water reservoir tank.

In the above oil-water recovering and separating apparatus, preferably, adjust means for adjusting the fluid level in the water reservoir tank and the fluid level in the separation tank is provided on a partition wall for partitioning the water reservoir tank and the drain tank.

According to another aspect of the present invention, provided is an oil-water recovering and separating apparatus for separating an oil-water mixture raw fluid into an oil part and a water part on the basis of difference in specific gravity, wherein: a raw fluid intake means for taking in the raw fluid recovered is provided in the recovering and separating apparatus; an outer cylinder is formed in the outside of the intake means; a flow-in portion for flowing in the raw fluid is formed between the outer cylinder and the intake means; a separation tank and an oil part recovery portion are provided in the flow-in portion; a recovery port of the oil part recovery portion is located so as to be slightly higher than the fluid level of the raw fluid in the separation tank; and scrape-up means are provided in the upper portion of the intake means and in the upper portion of the outer cylinder so as to move along the fluid level of the raw fluid flowing into the intake means and a in the flow-in portion so that floating solid matter and viscous oil part contained in the raw fluid is scraped up to the recovery port by the scrape-up means.

In the above oil-water recovering and separating apparatus, preferably, the raw fluid intake means is shaped like a cylinder and makes its inside formed spirally.

In the above oil-water recovering and separating apparatus, preferably, not only a whisker net prepared by forming metal whiskers in the form of a net is provided in the separation tank but also air flowing means for blowing air into the whisker net are arranged under the whisker net.

BRIEF DESCRIPTION OF THE DRAWINGS

FIG. 13 is a vertical sectional view showing a further embodiment of the oil-water recovering and separating apparatus according to the present invention;

PREFERRED EMBODIMENTS OF THE INVENTION

Figure 1:
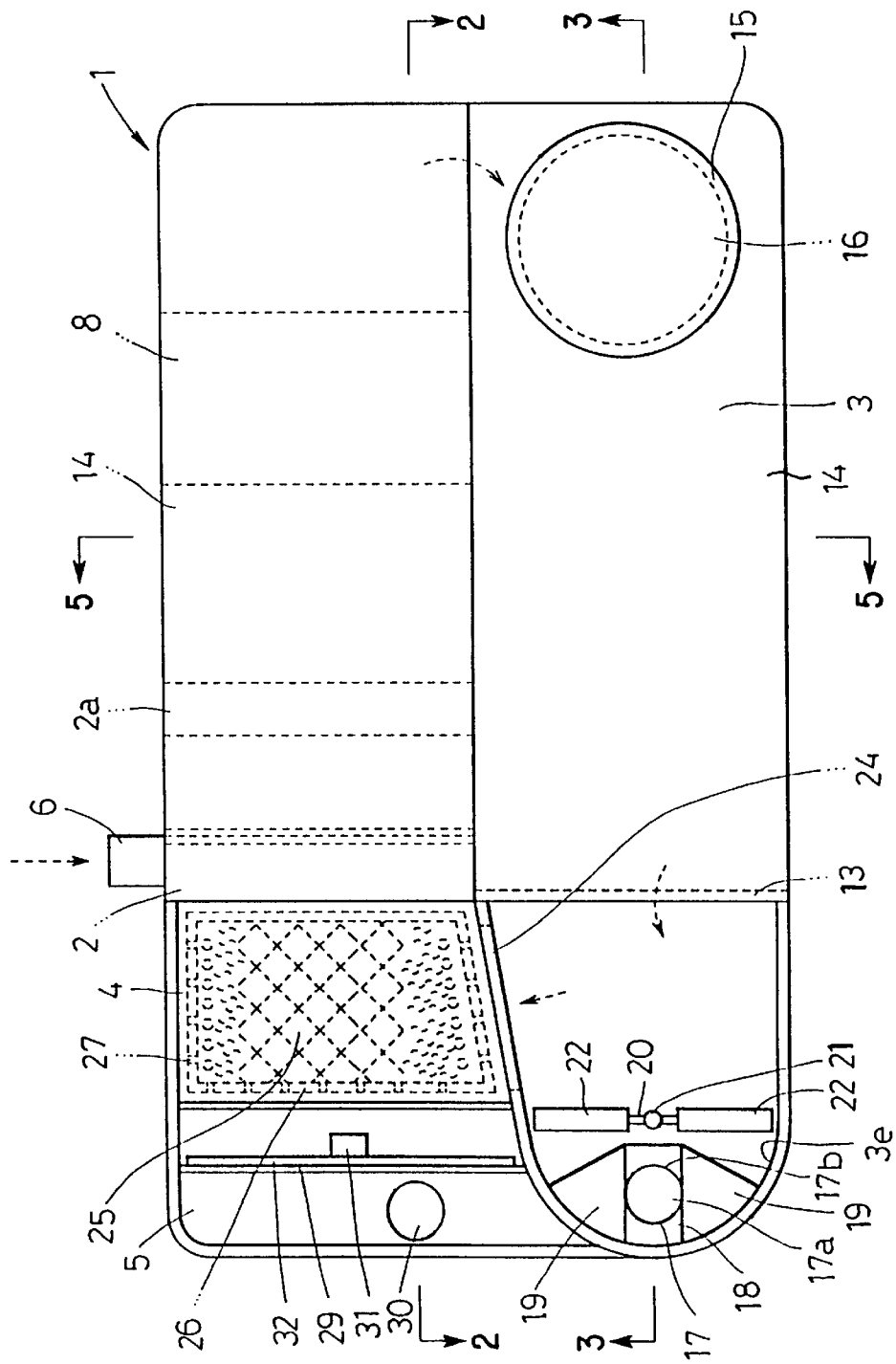
FIG. 1 is a partly omitted plan view of an embodiment of an oil-water separating apparatus according to the present invention.
Figure 2:
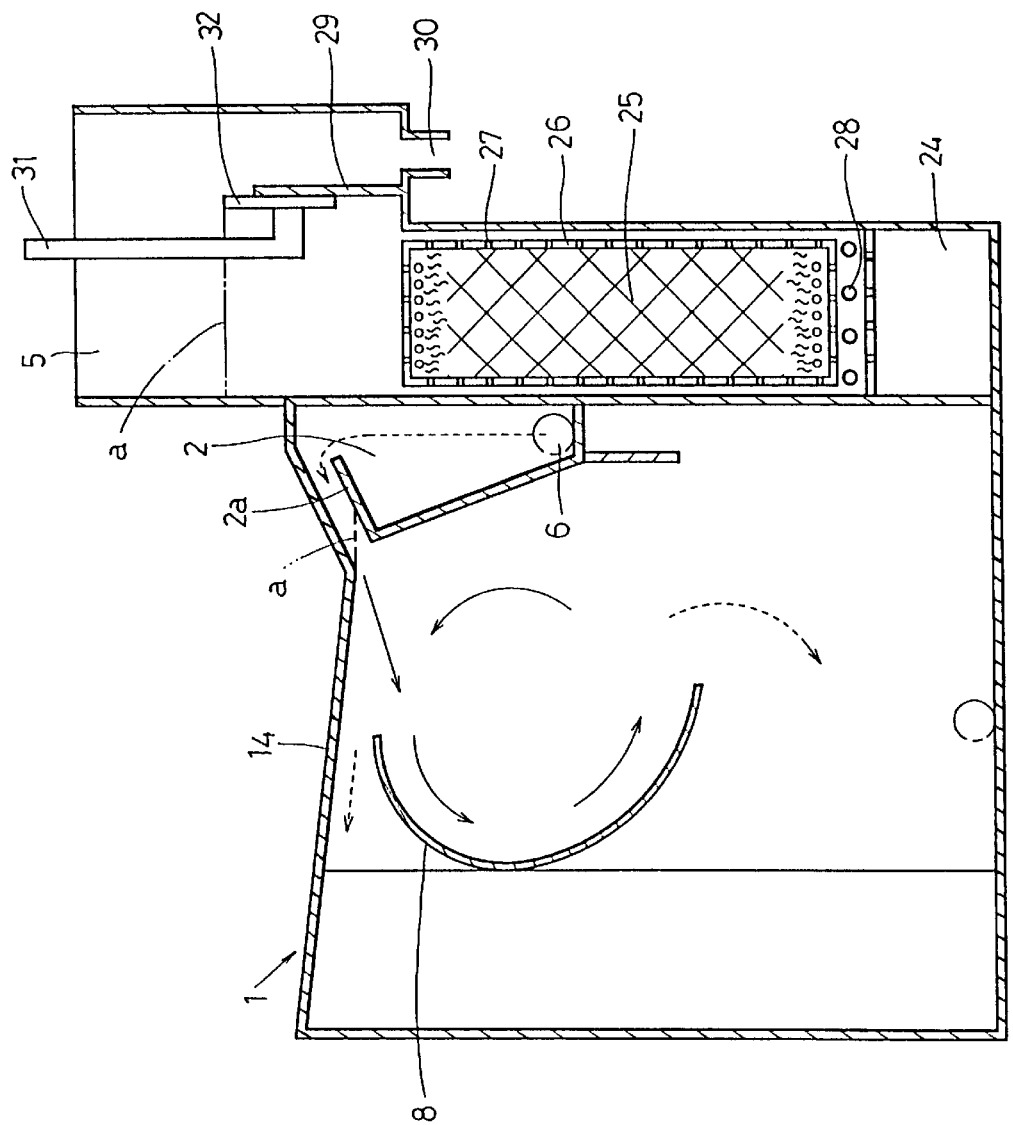
FIG. 2 is a rear view in vertical section taken along the line 2—2 in FIG. 1.
Figure 3:
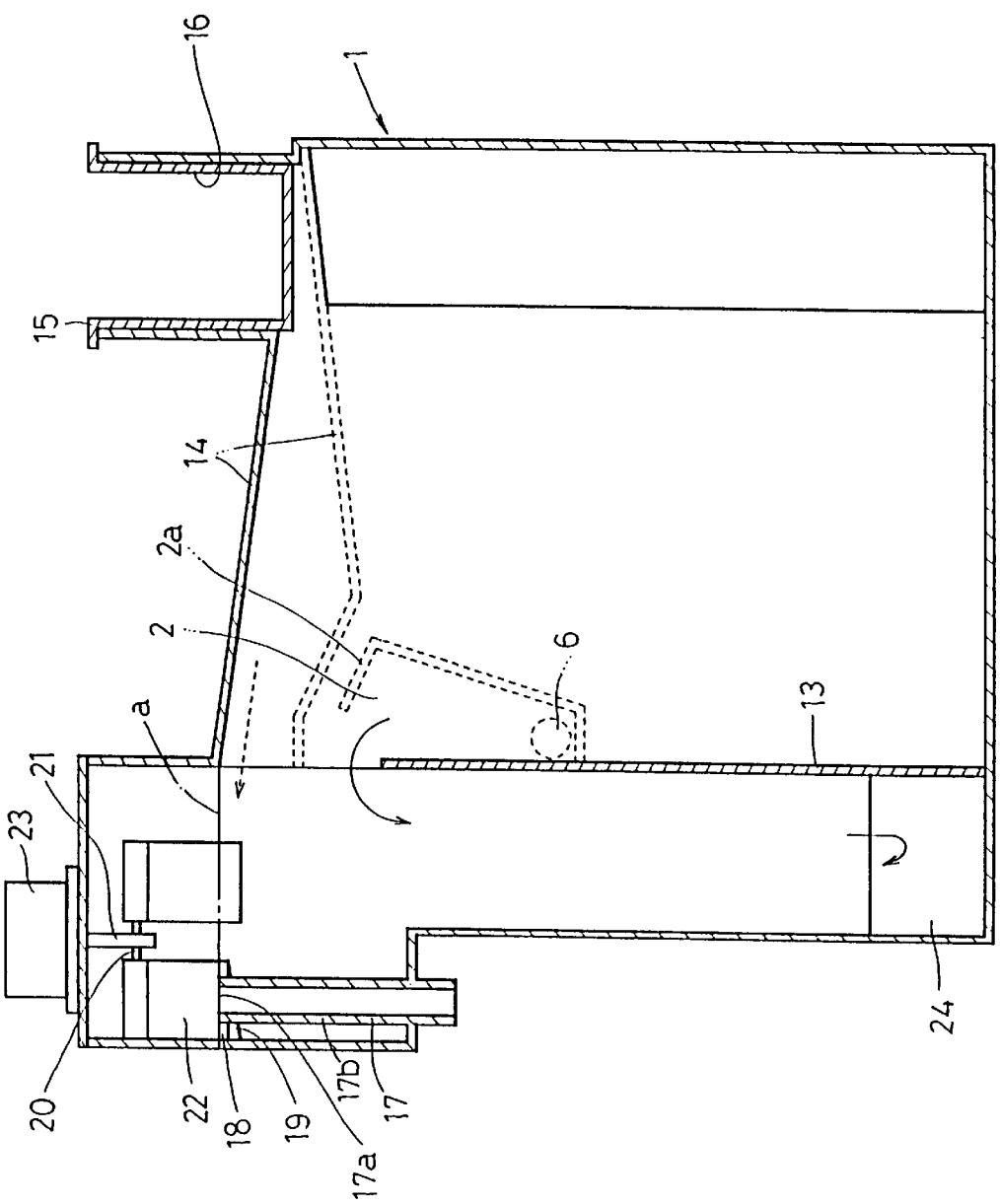
FIG. 3 is a front view in vertical section taken along the line 3—3 in FIG. 1.
Figure 4:
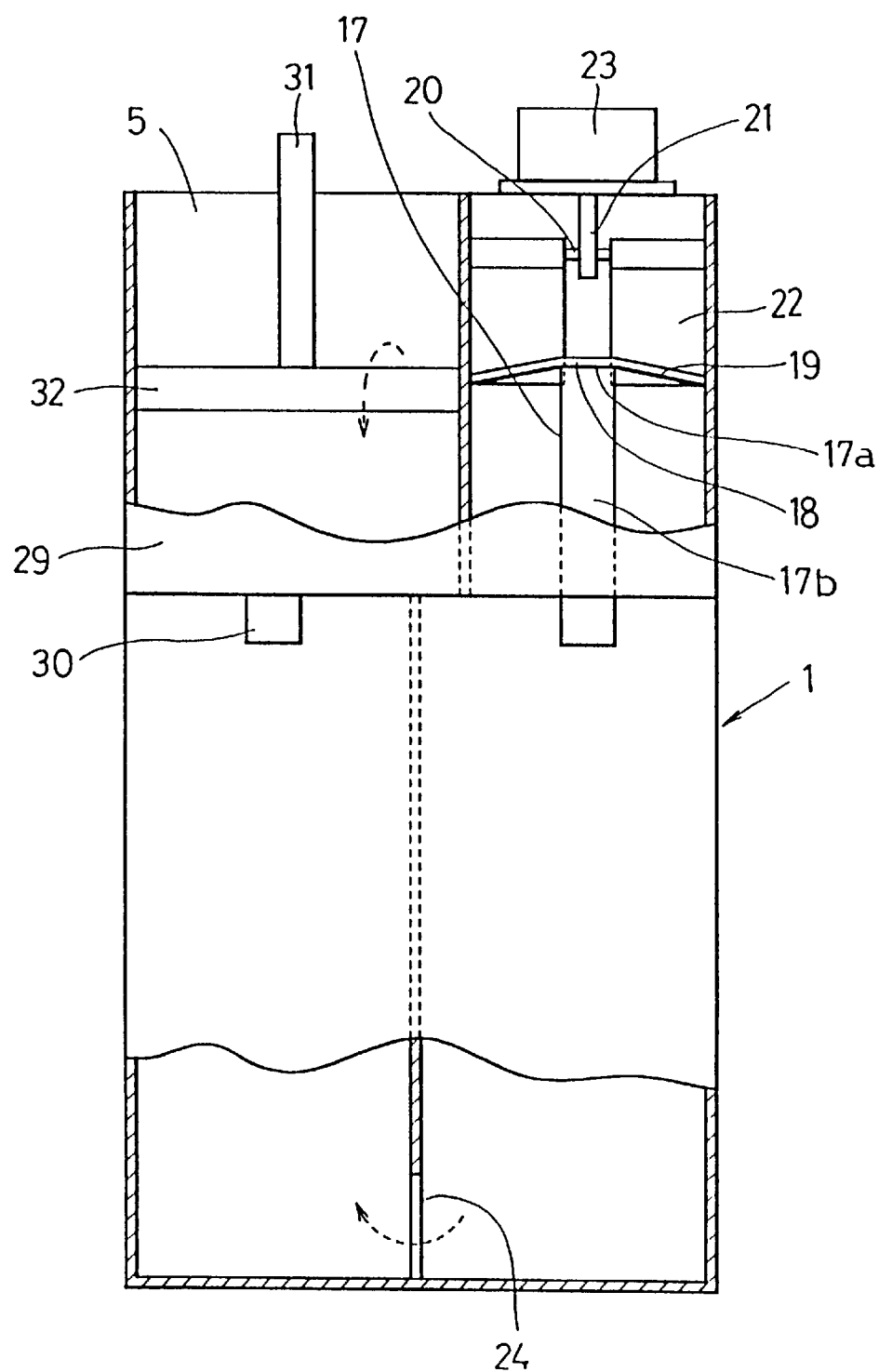
FIG. 4 is a partly cutaway left side view showing the oil-water separating apparatus.

Embodiments of the present invention will be described below with reference to the drawings.

In FIGS. 1 to 4, the reference numeral 1 designates an oil-water recovering and separating apparatus according to the present invention. The oil-water recovering and separating apparatus 1 is designed so that an oil-water mixture raw fluid discharged from a food factory, a machine factory, or the like, is recovered by a recovery pump (not shown) and separated into an oil part and a water part by using difference in specific gravity.

The oil-water recovering and separating apparatus 1 is provided with a raw fluid intake means 2 for taking in the raw fluid recovered, a separation tank 3 for separating the raw fluid taken in by the raw fluid intake means 2, a water reservoir tank 4 continued to the separation tank 3, and a drain tank 5 continued to the water reservoir tank 4.

The raw fluid intake means 2 is located substantially in the center of the recovering and separating apparatus 1 and near one longitudinal end of the recovering and separating apparatus 1 and has a tank structure in which a raw fluid recovery pipe 6 is attached to a side portion of the recovering and separating apparatus 1 so as to project to the outside of the recovering and separating apparatus 1. An inclined surface 2a is formed in an upper portion of the raw fluid intake means 2 so that the raw fluid in the inside flows down vigorously to the separation tank 3 at the time of overflow, and so that one end of the inclined surface 2a is located in a level higher than a fluid level a which is located at a head end in the separation tank 3.

The separation tank 3 is located over the whole length of the recovering and separating apparatus 1 in a range of from one longitudinal end to the opposite longitudinal end of the separating apparatus 1. An end portion of the separation tank 3 is curved so as to be nearly U-shaped in a plan view. The U-shaped curved end portion is disposed so as to be adjacent to the raw fluid intake means 2. Further, a guide plate 8 which is curved in the form of a circular arc correspondingly to the raw fluid flowing in from the inclined surface 2a of the raw fluid intake means 2 is provided on the head end side of the separation tank 3 so that the raw fluid is guided by the circular arc surface of the guide plate 8 and a corresponding side wall of the separation tank 3 to thereby generate a rotating flow as indicated by the arrows in FIG. 2.

Figure 5:
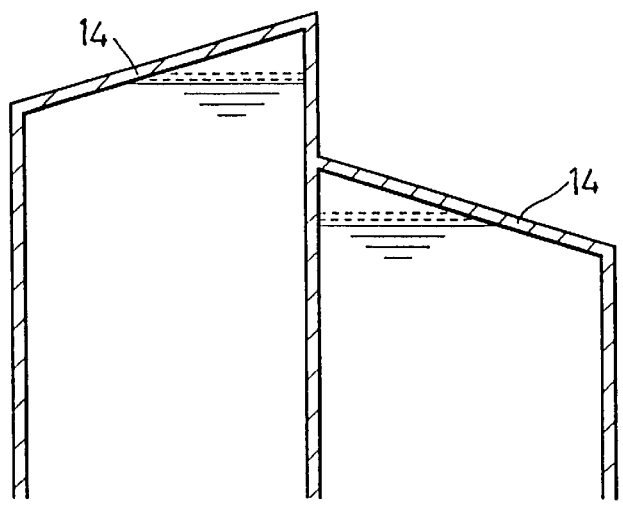
FIG. 5 is a side view in vertical section showing the inclined ceiling portion taken along the line 5—5 in FIG. 1.
Figure 6:
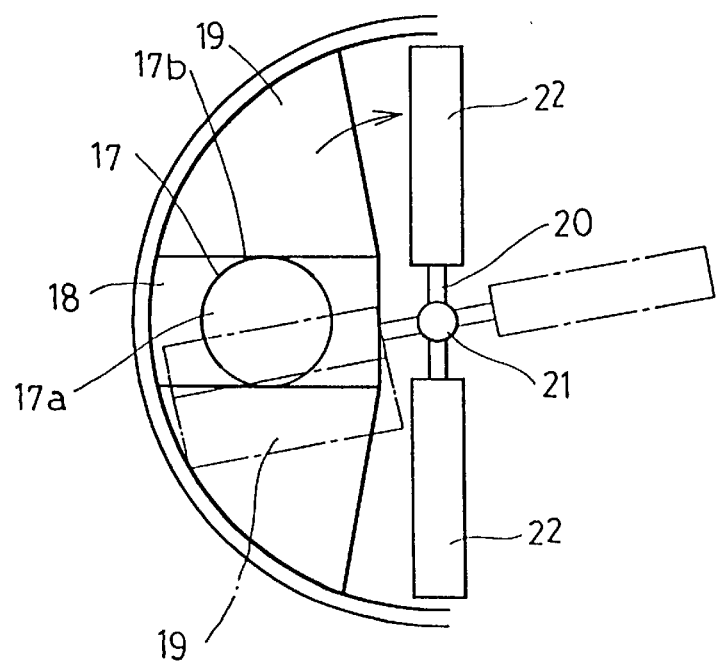
FIG. 6 is an explanatory view showing the relation between the oil part recovery pipe and the scrape-up means.
Figure 7:
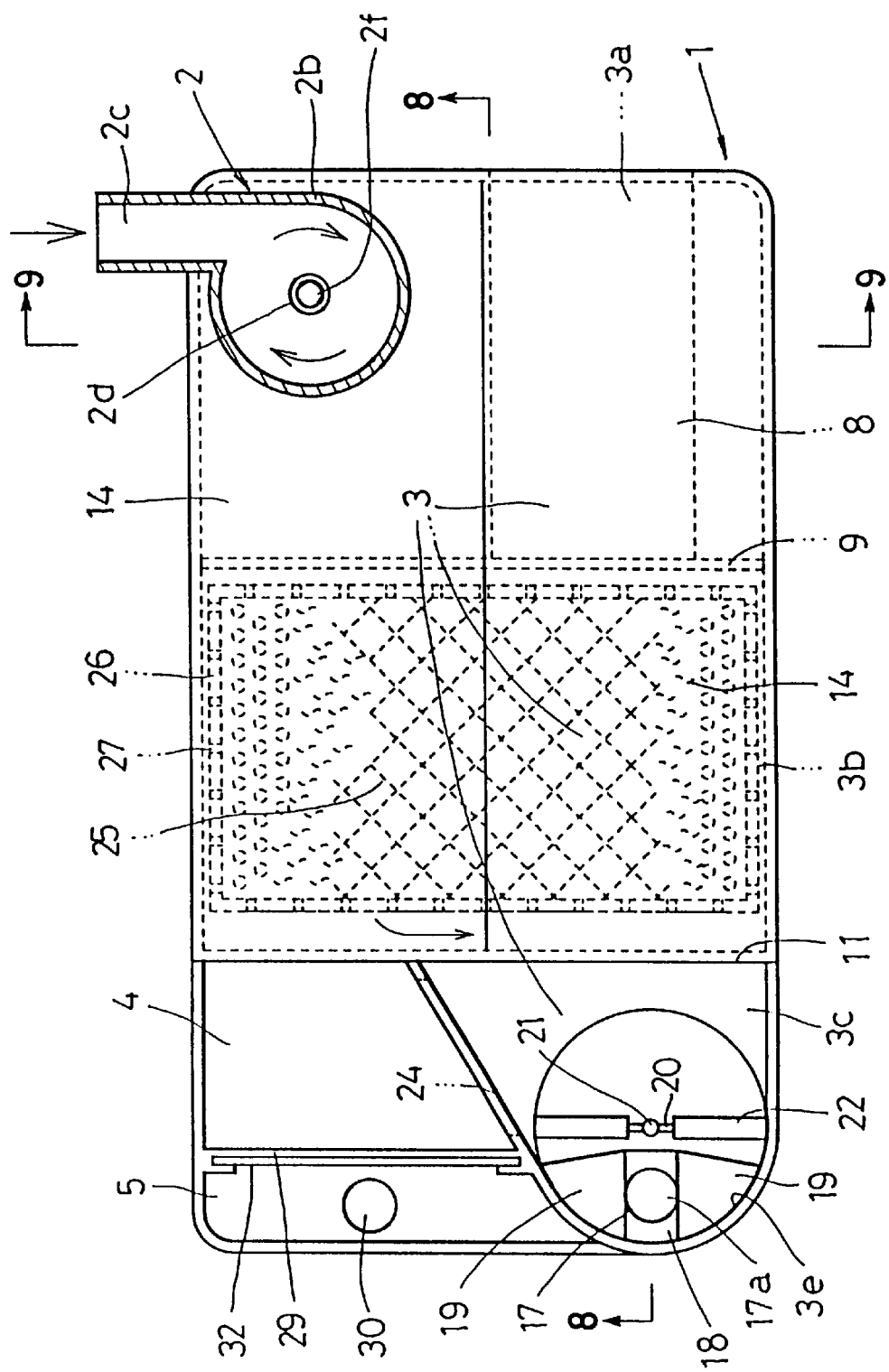
FIG. 7 is a partly omitted plan view of another embodiment of the oil-water separating apparatus according to the present invention.
Figure 8:
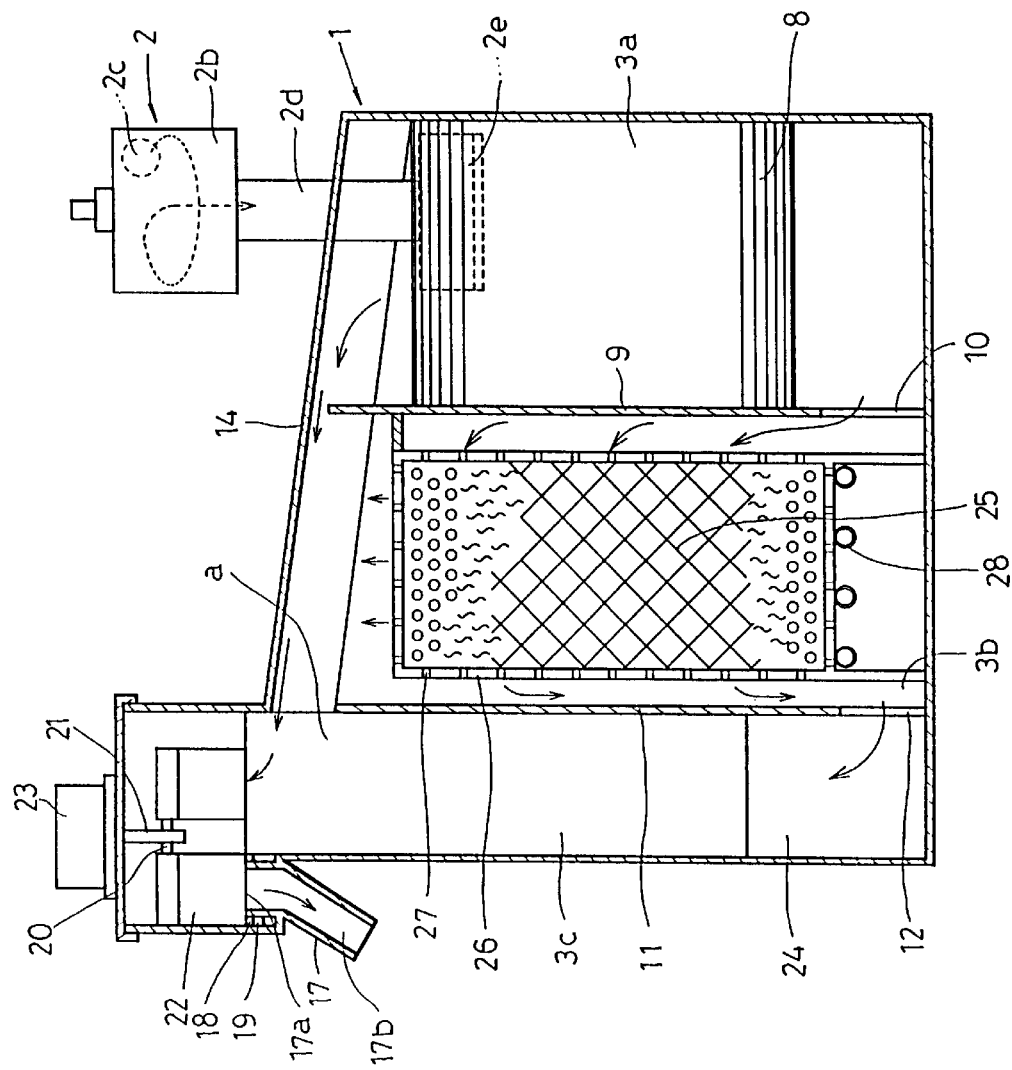
FIG. 8 is a front view in vertical section taken along the line 8—8 in FIG. 7.

A scrape-up means which will be described later is provided on the tail end side of the separation tank 3. A partition wall 13 is provided in the separation tank 3 so as to be disposed near the scrape-up means. The upper portion of the partition wall 13 is located in a level slightly lower than the fluid level in this portion. An inclined ceiling 14 is disposed in the upper portion of the separation tank 3 except the tail end side end portion thereof. Because the raw fluid flows from the head end side of the separation tank 3 to the tail end side thereof, the inclination of the inclined ceiling 14 is set so that the downstream side height in the flow direction increases gradually and the removal of oil due to the buoyancy of oil part is guided by the inclination so as to be performed smoothly. The inclined ceiling 14 is shaped like a single-flow roof from the view of the flow direction (see FIG. 5) so that oil part floating up is recovered from the base portion of the roof shape toward the top portion thereof. Further, an inspection window 16 to be closed by a lid 15 is provided in the inclined ceiling 14 so as to be located just above a portion in which the separation tank 3 U-turns from one longitudinal end to the opposite longitudinal end.

An oil part recovery pipe 17b constituting a oil part recovery portion 17 is disposed near the semicircular portion, in a plan view, of the tail end side end portion of the inclined tank 3 having no inclined ceiling 14. A recovery port 17a in the upper end of the oil part recovery pipe 17b is located slightly above the fluid level a and the lower end of the oil part recovery pipe 17b is made to project to the outside of the separation tank 3. A horizontal plate member 18 is provided to surround the recovery port 17a. Plate members 19 are provided so as to be inclined downward in opposite sides of the plate member 18. The outside of the plate member 18 and the inclined plate members 19 is curved so as to be adapted to the shape of the tail end side end portion in the separation tank 3.

Next, a scrape-up means is disposed above the recovery port 17a of the oil part recovery pipe 17b of the oil part recovery portion 17 so that the scrape-up means moves along the fluid level 7a and scrapes up scum, viscous oil part, or the like, floating in the fluid surface to thereby recover it to the oil part recovery portion 17. The scrape-up means is composed of attachment shafts 20 formed from resin or metal such as stainless steel, or the like, a rotation shaft 21 fixed on the upper portion of the center of the attachment shafts 20, and scrape-up plates 22 formed from metal such as stainless steel, or the like, so as to be movably pivotally supported to the attachment shafts 20. The rotation shaft 21 is connected to a motor 23. Incidentally, brushes, clothes, or the like may be used in place of scrape-up means.

The water reservoir tank 4 is provided so as to be adjacent to the tail end side of the separation tank 3. The water reservoir tank 4 and the separation tank 3 are continued to each other by an opening portion 24 formed in the lower portion of the tail end side wall of the separation tank 3. Further, a vessel 26 filled with a whisker net 25 prepared by forming whiskers of metal such as stainless steel or the like (fine wires of 30 to 40 microns) in the form of a net is disposed in the water reservoir tank 4. A large number of pores 27 are formed in the vessel 26. Further, air pipes 28 having a large number of pores formed therein are disposed under the vessel 26.

Incidentally, the surfaces of the whiskers may be acid-pickled to be subjected to satin finish (rough surface finish)

to enlarge the surface area to thereby make it easy to deposit oil particles on the surfaces. The vessel 26 may be interchangeably provided or may be provided so as to be able to be cleaned by vibration.

The drain tank 5 provided so as to be adjacent to the water reservoir tank 4 is separated from the water reservoir tank 4 by a partition wall 29. A drain pipe 30 projecting to the outside is attached to the center bottom portion of the drain tank 5. Further, an adjust means constituted by an adjust plate 32 is provided on the partition wall 29 so as to be lifted up/down by a handle 31, or the like, to make the fluid level a of the water reservoir tank 4 and the tail end fluid level of the separation tank 3 even in one plane. Although the fluid level in the separation tank 3 fluctuates vertically so as to be high or low in accordance with the amount of recovery of the raw fluid sent to the raw fluid intake means 2 by means of the recovery pump (not shown), the fluctuation may be eliminated by lifting up/down the adjust plate 32 in this occasion.

According to the oil-water recovering and separating apparatus 1 configured as described above, when an oil-water mixture raw fluid is supplied from the raw fluid recovery pipe 6 to the raw fluid intake means 2, the raw fluid overflowing from the raw fluid intake means 2 flows into the separation tank 3 in the head end side along the inclined surface 2a in the upper portion of the raw fluid intake means 2. The raw fluid flowing into the separation tank 3 is guided by the corresponding circular arc surface of the guide plate 8 and a side wall of the separation tank 3 corresponding to the circular arc surface to generate a rotating flow as indicated by the arrows in FIG. 2. Because the flowing distance of the raw fluid is extended by the rotating flow to thereby increase the opportunity of separation based on difference in specific gravity, the raw fluid is separated into an oil part and a water part effectively so that the oil part is floated and the water part is precipitated.

The thus floated oil part is made to flow in the separation tank 3 toward the tail end side along the inclined surface while air is cut off by the inclined ceiling 14 of the separation tank 3 so that the state of the oil part is not changed to a state in which the oil part hardly overflows because of the vaporization of the oil part.

Because the water part guided to the tail end side of the separation tank 3 still contains a more or less amount of the oil part, specific gravity difference separation is further performed in this tail end side. The oil part floated up by separation in this tail end side of the separation tank 3 and the oil part floated up by separation in the head end side of the separation tank 3 are insulated from air by the inclined ceiling 14 and guided to the neighborhood of the oil part recovery pipe 17b provided in the tail end side end portion of the separation tank 3.

Incidentally, because the oil part guided to the neighborhood of the oil part recovery pipe 17b contains scum, viscous oil part, or the like, floated therein, the motor 23 is started to rotate the rotation shaft 21 to thereby rotate the scrape-up plates 22. Accordingly, scum, viscous oil part, or the like, is scraped up by the scrape-up plates 22 along the inclined plate members 19 provided to the recovery port 17a of the oil part recovery pipe 17b and is recovered to the recovery port 17a.

In the above description, scum, viscous oil part, or the like, scraped up along the plate members 19 by the rotation of the scrape-up plates 22 tries to run away outward but is blocked by the wall surface 3e of the semicircular portion, in a plan view, of the tail end side end portion of the separation tank 3 so that scum, viscous oil part, or the like, can be securely guided to the recovery port 17a of the oil part recovery pipe 17b by the scrape-up plates 22.

On the other hand, the water part guided to the tail end side of the separation tank 3 flows into the water reservoir tank 4 through the opening portion 24 formed in the lower portion of the tail end side wall of the separation tank 3 but the water part thus flowing in still contained more or less oil particles. When the particles come into contact with fine wires of the whisker net 25, the particles are deposited on one another by surface tension so as to grow to rough particles. The rough particles float up to the surface of the water reservoir tank 4 so as to be recovered whereas the water part passes through the opening portion 24 as it is. In this manner, because the oil part is recovered also by the whisker net 25, the efficiency of oil-water separation is good. The oil part deposited on the whisker net 25 is forced from the whisker net 25 so as to float up by air generated by the air pipes 28.

The water part having passed through the whisker net 25 in the water reservoir tank 4 overflows from the adjust plate 32 of the adjust means of the partition wall 29 into the drain tank 5 so as to be discharged from the drain pipe 30 provided in the lower portion of the drain tank 5. Oil is completely separated from water by repeating such a separating operation so that the oil part is recovered.

Another embodiment of the oil-water recovering and separating apparatus according to the present invention will be described below with reference to FIGS. 7 through 12.

The oil-water recovering and separating apparatus 1 in this embodiment is also provided with means 2 for taking in a raw fluid recovered, a separation tank 3 for separating the raw fluid taken in, a water reservoir tank 4 continued to the separation tank 3, and a drain tank 5 continued to the water reservoir tank 4. This embodiment is, however, different from the aforementioned embodiment in the structure of the raw fluid intake means 2 and the separation tank 3. The point of difference will be explained below and the parts the same in structure as in the aforementioned embodiment are referenced correspondingly so that the description thereof will be omitted here.

The raw fluid intake means 2 is located in the upper portion of one longitudinal side of the oil-water recovering and separating apparatus 1 and uses a chamber 2b circularly shaped in a plan view to form a cyclone structure in which a raw fluid intake pipe 2c is tangentially connected to the upper circumferential surface of the circular chamber 2b and in which a raw fluid feed pipe 2h facing the head end of the separation tank 3 is connected to the center of the bottom portion of the chamber 2b. A circular arc-shaped guide portion 2e is attached to the lower end of the raw fluid feed pipe 2h so that the direction of flow of the raw fluid is spread horizontally toward a circular arc-shaped guide plate 8 disposed in the head end side of the separation tank 3, that is, disposed in a first separation tank 3a. An air outlet 2g is provided in the center of the ceiling surface of the circular chamber 2b so as to be closed hermetically by attachment of a stopper 2f and opened by release of the stopper 2f.

Figure 11:
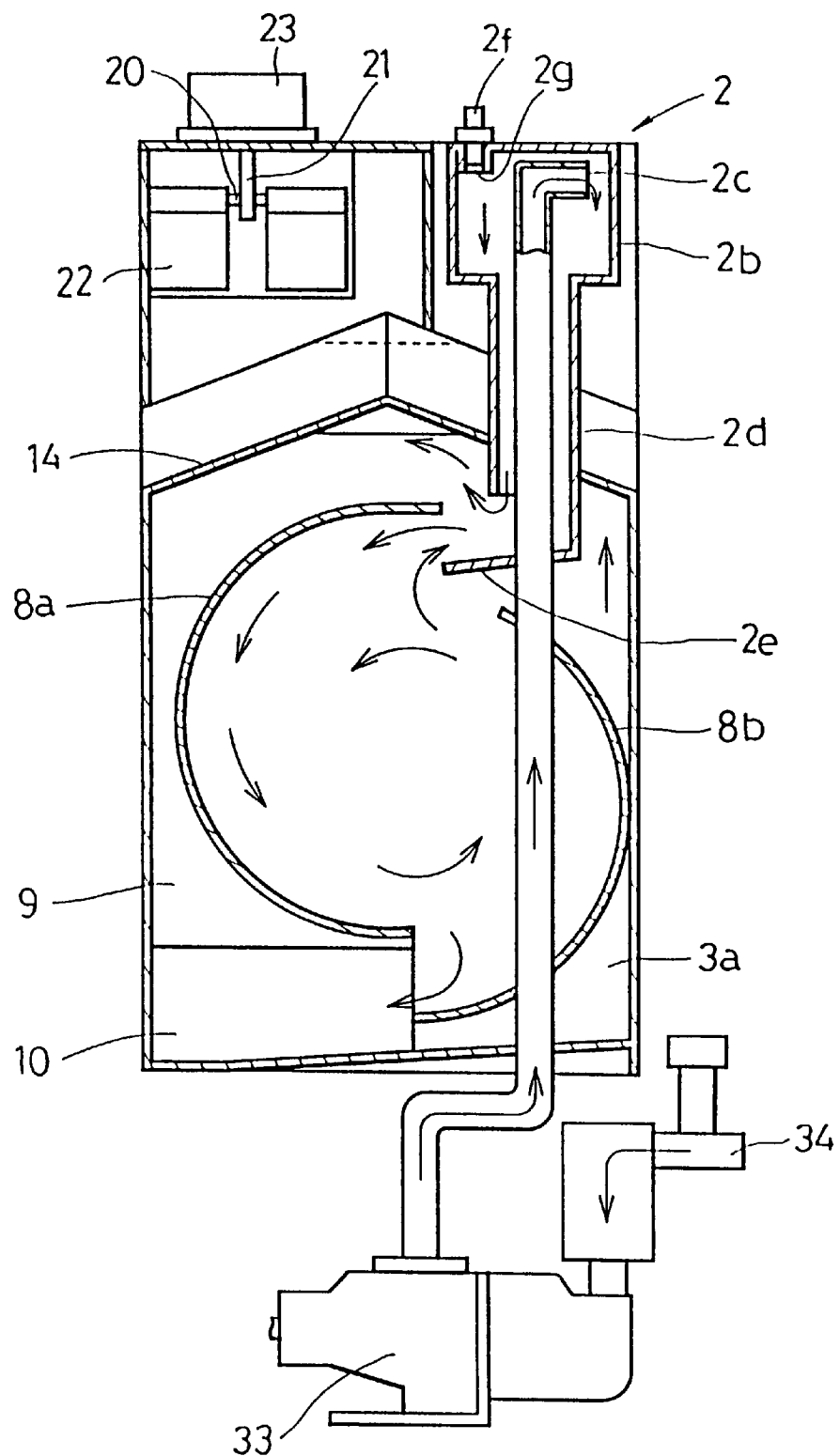
FIG. 11 is a right side view in vertical section showing an example in which a plurality of circular arc-shaped guide plates in FIG. 9 are provided.
Figure 12:
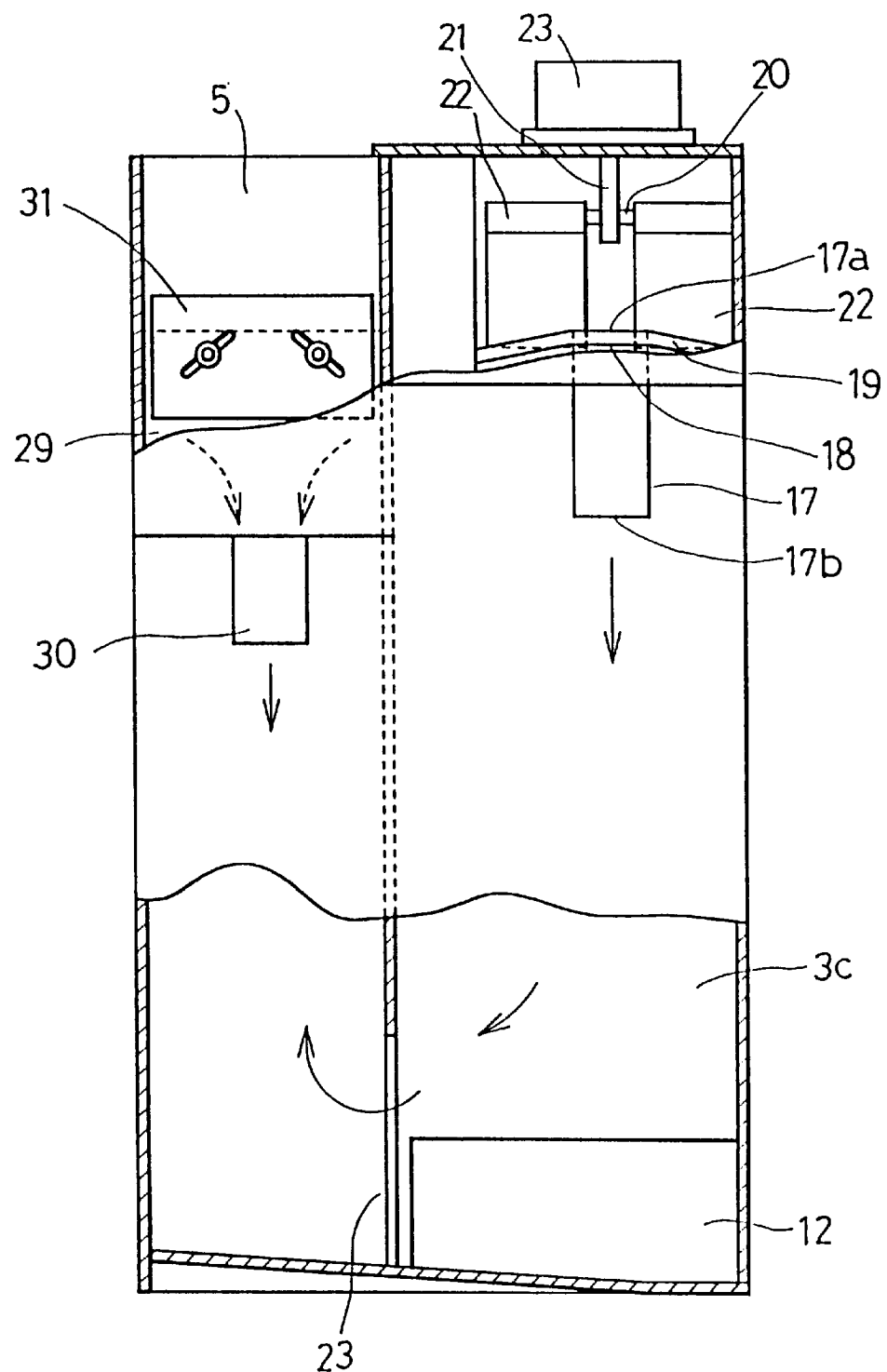
FIG. 12 is a partly cutaway left side view of the oil-water separating apparatus.
Figure 14A:
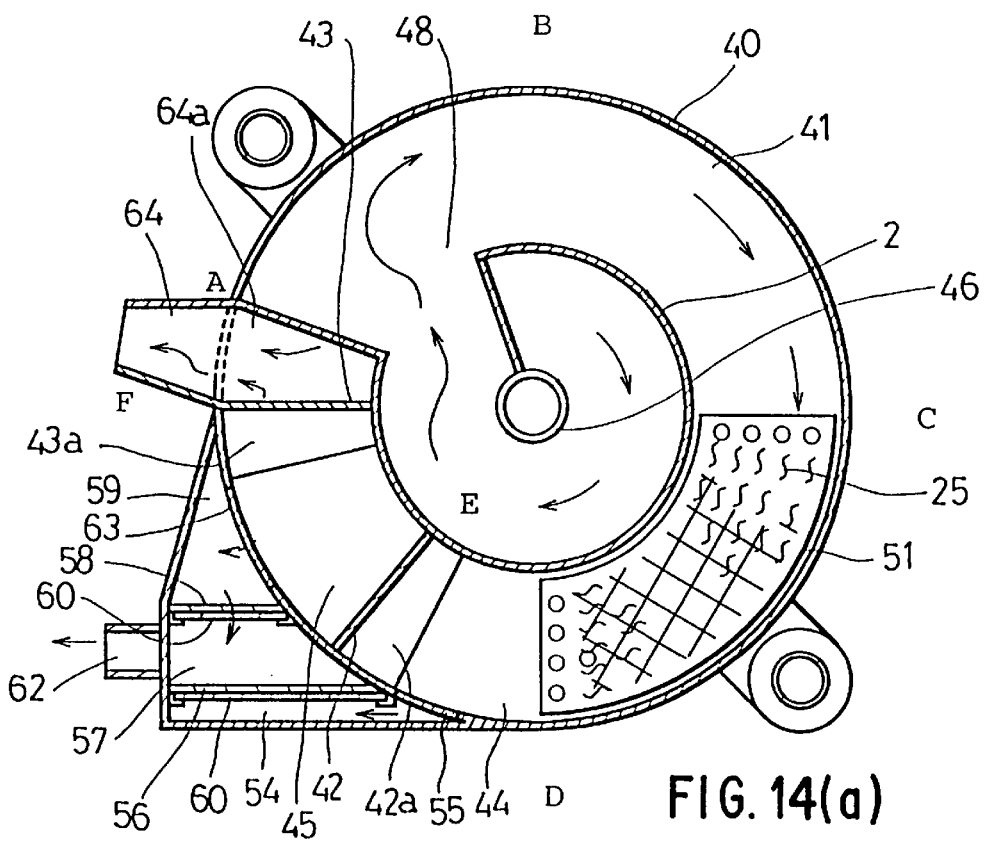
FIG. 14A is a partly omitted horizontal sectional view showing the oil-water recovering and separating apparatus of FIG. 13.
Figure 14B:
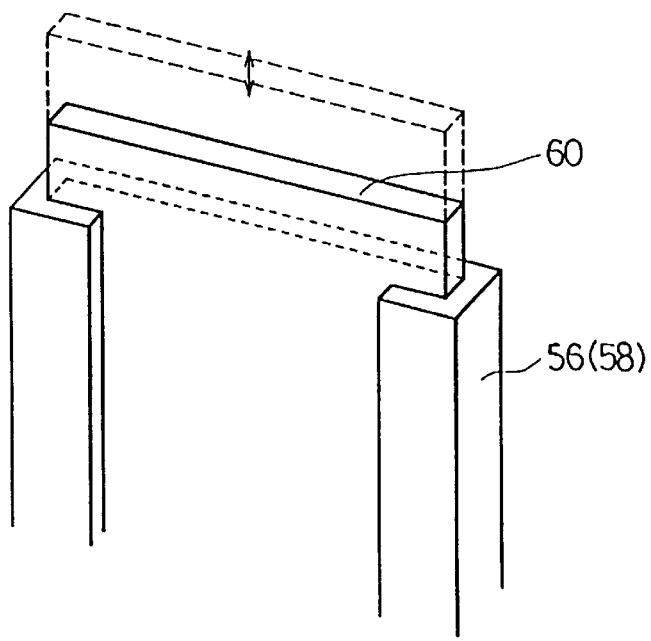
FIG. 14B is an explanatory view showing the operating state of a partition plate attached to a partition wall in the further embodiment.
Figure 15:
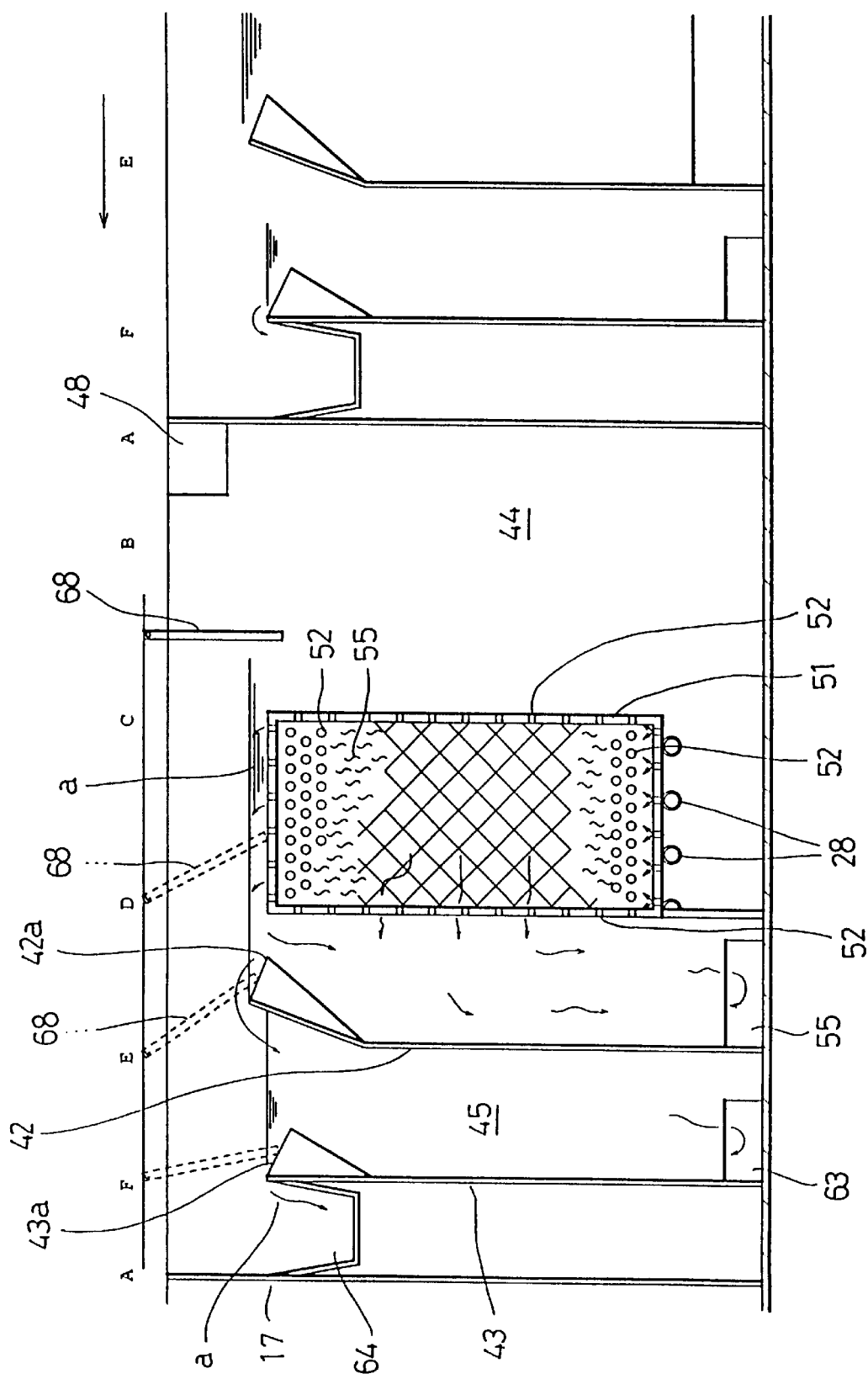
FIG. 15 is a development view of the oil-water recovering and separating apparatus in the further embodiment.
Figure 16A:
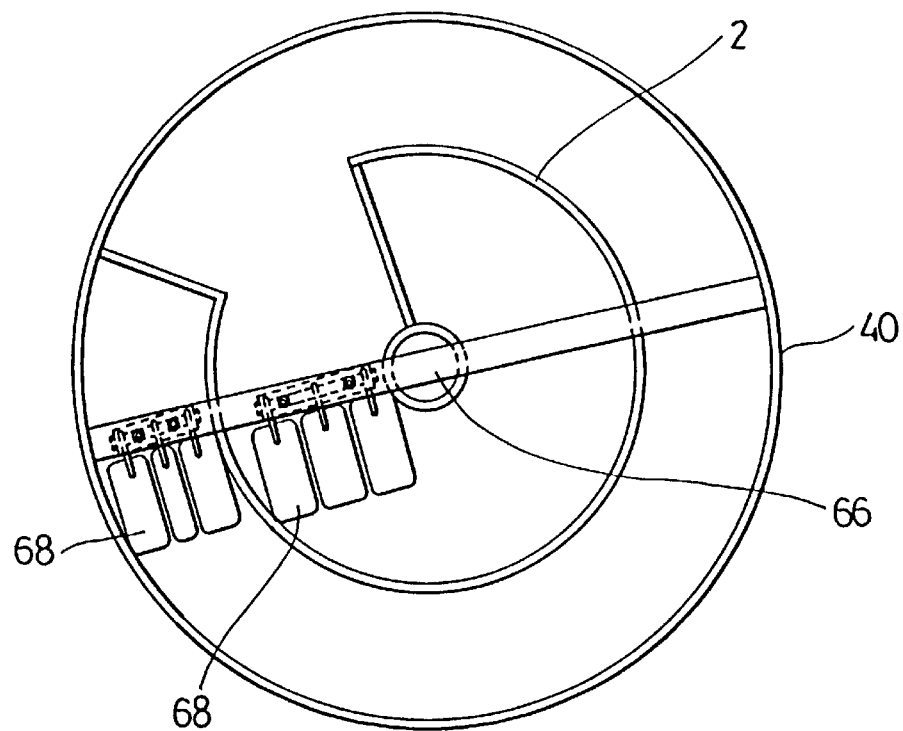
FIG. 16A is an explanatory plan view showing the state in which scrape-up plates are attached to the rotation plate.
Figure 16B:
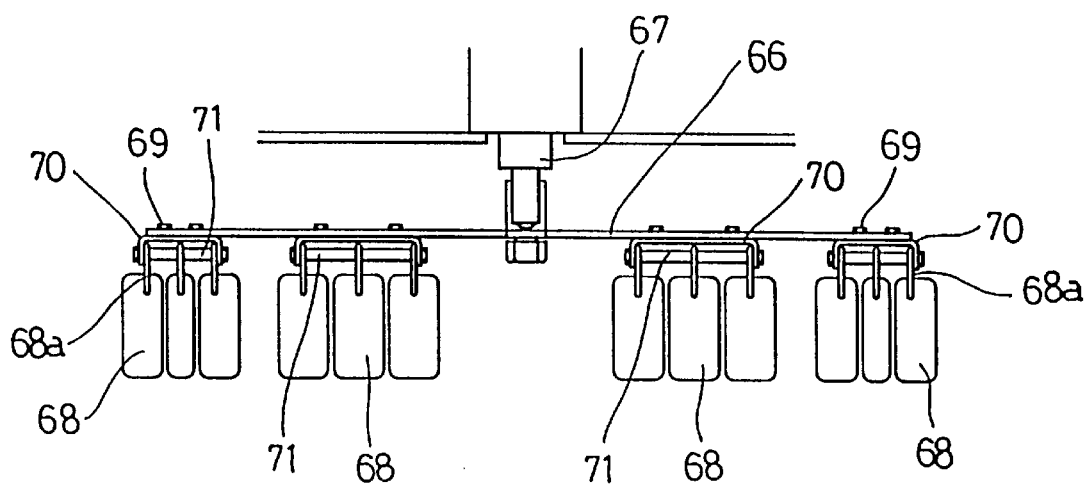
FIG. 16B is a front view showing the state in which the scrape-up plates are attached to the rotation plate.

Although the aforementioned raw fluid intake means 2 has shown upon the case where the raw fluid intake pipe 2c is tangentially connected to the upper circumferential surface of the circular chamber 2b from the outside, a rotating flow can be generated in the circular chamber 2b in such a manner as follows: the raw fluid intake pipe 2c pierces the separation tank 3a vertically from below as shown in FIG. 11 so that the upper portion of the raw fluid intake pipe 2c is inserted into the center of the circular chamber 2b and so that the upper end thereof is opened to generate a rotating flow of the raw fluid in the circular chamber 2b; and a feed pipe 2d having a diameter larger than the diameter of the raw fluid intake pipe 2c is provided in the outside of the intake pipe 2c to thereby feed the raw fluid sucked from an intake portion 34 of a pump 33 provided under the separation tank 3a to the intake pipe 2c. In this case, the apparatus can be made compact so that piping is simplified.

Figure 9:
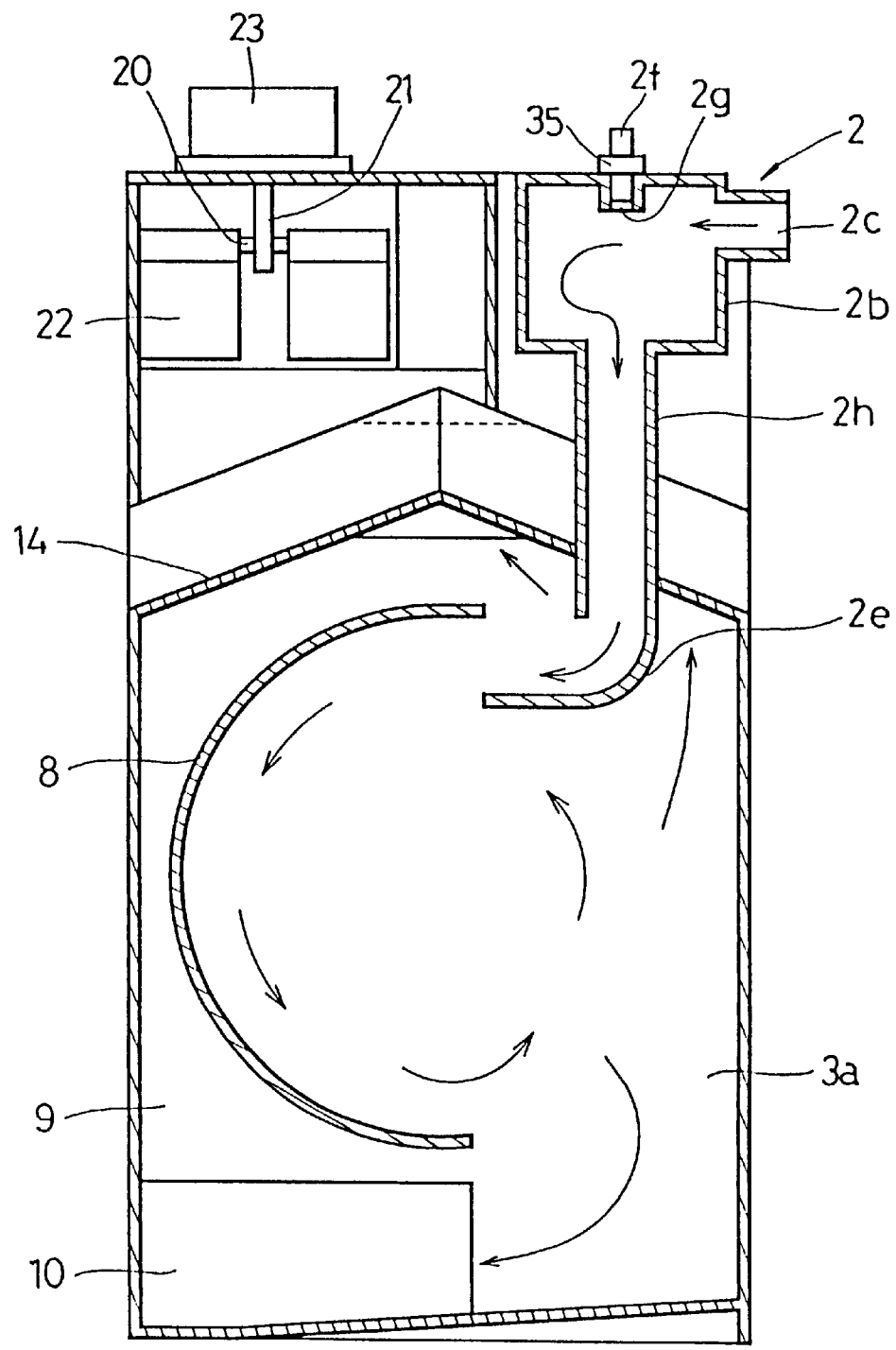
FIG. 9 is a right side view in vertical section taken along the line 9—9 in FIG. 7.
Figure 10:
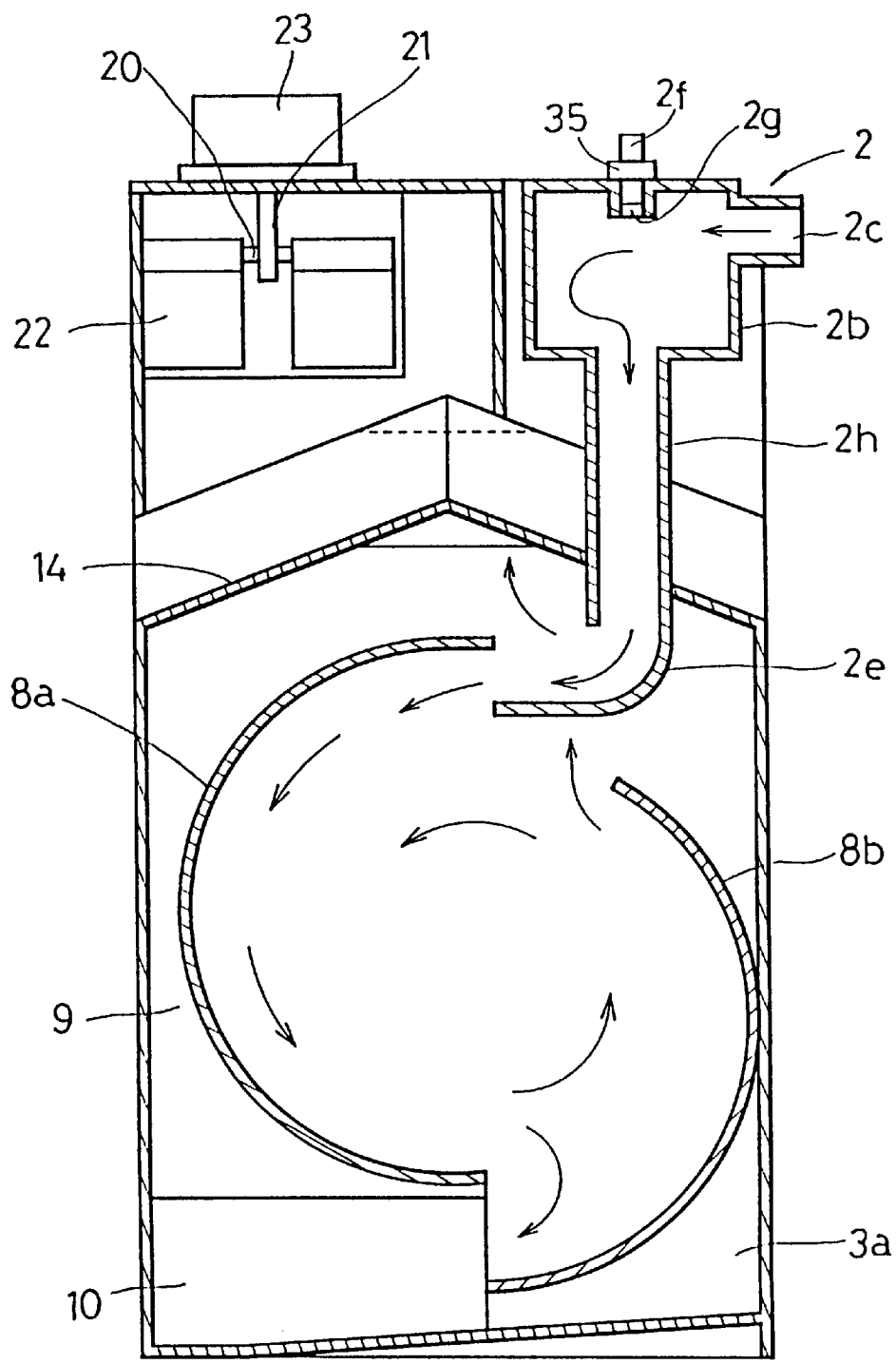
FIG. 10 is a right side view in vertical section showing an example in which the raw fluid intake means depicted in FIG. 9 is partly modified.

As the separation tank 3, a portion formed by partition in one longitudinal end of the oil-water recovering and separating apparatus 1, except the water reservoir tank 4 and the drain tank 5, is used. The separation tank 3 is partitioned into a first separation tank 3a, a second separation tank 3b and a third separation tank 3c. A circular arc-shaped guide plate 8 as shown in FIG. 9 may be provided in the first separation tank 3a correspondingly to the raw fluid flowing-in from the raw fluid feed pipe 2d of the raw fluid intake means 2. Thus, the raw fluid is guided by the circular arc surface of the guide plate 8 and a side wall of the separation tank 3a corresponding to the circular arc surface to generate a rotating flow of the raw fluid as indicated by the arrows in FIG. 9. Alternatively, two circular arc-shaped guide plates 8a and 8b as shown in FIG. 10 may be disposed to be opposite to each other such that the position of the guide plate 8b is displaced from the position of the guide plate 8a so as to be lower than the latter so that the raw fluid is guided by the guide plates 8a and 8b to generate a rotating flow of the raw fluid as indicated by the arrows in FIG. 10. Further, in the aforementioned embodiment, the whisker net 25 provided in the water reservoir tank 4 is provided in the second separation tank 3b.

A partition wall 9 for partitioning the first and second separation tanks 3a and 3b has an upper portion located in a position slightly lower than the fluid level in this portion and a lower portion in which an opening portion 10 is formed. Also a partition wall 11 for partitioning the second and third separation tanks 3b and 3c has an upper portion located in a position slightly lower than the fluid level in this portion and a lower portion in which an opening portion 12 is formed.

Further, in the separation tank 3 except the third separation tank 3c, an inclined ceiling 14 is disposed in the upper portion thereof. Because the raw fluid flows from the first separation tank 3a to the third separation tank 3c through the second separation tank 3b, not only the inclination of the inclined ceiling 14 is set so as to make the downstream side in the direction of flow of the raw fluid higher gradually so that removal of the oil part based on the buoyancy of the oil part is performed well, but also the shape of the inclined ceiling 14 in the view from the direction of flow of the raw fluid is provided in the form of a double-flow roof (see FIGS. 9 to 11) so that the oil part is collected to the top portion.

In the oil-water recovering and separating apparatus 1 of the type configured as described above so that one circular arc-shaped guide plate 8 is provided, when the air outlet 2g provided in the ceiling surface of the circular chamber 2b in the raw fluid intake means 2 is opened and an oil-water mixture raw fluid containing a small amount of air is sent in from the intake pipe 2c, the raw fluid flows so as to rotate along the circumferential wall of the circular chamber 2b so that the raw fluid flows from the feed pipe 2d toward the circular arc-shaped guide plate 8 in the first separation tank 3a while the mixed air is discharged from the air outlet 2g. As a result, the raw fluid is guided by the circular arc surface of the guide plate 8 and the side wall of the separation tank 3a opposite to the circular arc surface to generate a rotating flow of the raw fluid as indicated by the arrows in FIG. 9. Accordingly, because the flowing distance of the raw fluid is extended due to the rotating flow of the raw fluid so that the opportunity of specific gravity difference separation increases, the raw fluid is separated into an oil part and a water part effectively so that the oil part is floated up whereas the water part is precipitated. Because the oil part floated up is insulated from air by the inclined ceiling 13 of the separation tank 3, the raw fluid flows into the second separation tank 3b along the inclined surface without any difficulty of overflowing caused by vaporization of the oil part so that the precipitated water part flows from the opening portion 10 in the lower portion of the partition wall 9 into the second separation tank 3b.

In the case where a rotating flow of the raw fluid is generated by the arc-shaped guide plate 8 and the wall of the separation tank 3a as described above, the rotating flow generated by the circular arc surface of the guide plate 8 is, however, disturbed in the wall side of the separation tank 3a to bring such a tendency that not only the rotating state is irregular but also the rotating flow is eliminated rapidly. Therefore, when two circular arc-shaped guide plates 8a and 8b are provided to be opposite to each other while the positions thereof are displaced from each other vertically as shown in FIG. 10, the raw fluid guided by the circular arc surface of the first guide plate 8a to generate a rotating flow is also guided by the circular arc surface of the next guide plate 8b to prevent the rotating flow from being disturbed. Accordingly, a regular rotating flow of the raw fluid can be kept for a required period of time.

Because the water part guided to the second separation tank 3b still contains a more or less amount of the oil part, specific gravity difference separation is performed continuously. Because the whisker net 25 is provided in the separation tank 3b, fine particles of the oil part contained in the water part are deposited on the whisker net 25 by surface tension when the fine particles come into contact with fine wires of the whisker net 25 at the time of passing of the fine particles through the whisker net 25. Because the deposited particles grow due to deposition of succeeding particles to form rough particles, the rough particles are floated up so as to be separated. Accordingly, the separated oil part is insulated from air by the inclined ceiling 13 and flows into the third separation tank 3c due to a water flow, whereas the water part flows into the third separation tank 3c through the opening portion 12.

Because the oil part guided to the neighborhood of the oil part recovery pipe 17b of the oil part recovery portion 17 in the third separation tank 3c contains scum, viscous oil part, or the like, floated therein, the motor 23 is started to rotate the rotation shaft 21 to thereby rotate the scrape-up plates 22. Accordingly, scum, viscous oil part, or the like, is scraped up by the scrape-up plates 22 along the inclined plate member 19 provided in the recovery port 17a of the oil part recovery pipe 17b so that scum, viscous oil part, or the like, is recovered to the recovery port 17a. On the other hand, the water part overflows from the adjust plate 32 of the partition wall 29 into the drain tank 5 and is discharged from the drain pipe 30 provided in the lower portion of the drain tank 5. Oil is completely separated from water by repeating this operation, so that the oil part is recovered. Further, the fluid level a in the water reservoir tank 4 and the fluid level a in the separation tank 3c can be moved up/down and adjusted so as to be even in one plane by moving up/down the adjust plate 32.

Incidentally, scum, viscous oil part, or the like, tries to run away outward while being collected by the scrape-up plates 22 but the movement is blocked by the wall surface 3e of the semicircular portion, in a plan view, of the tail end side end portion of the separation tank 3. Accordingly, scum, viscous oil part, or the like, can be securely guided to the recovery port 17a of the oil part recovery pipe 17b by the scrape-up plates 22.

Further, when the air outlet 2g provided in the ceiling surface of the circular chamber 2b of the raw fluid intake means 2 is closed hermetically by the stopper 35 and an oil-water mixture raw fluid containing not only scum, impurities, or the like, but also air is sent in from the intake pipe 2c, air is not discharged even if the raw fluid flows so as to rotate along the circumferential wall of the circular chamber 2b in this occasion. Accordingly, the raw fluid flows into the first separation tank 3a toward the circular arc-shaped guide plate 8 provided in the first separation tank 3a from the feed pipe 2d in a state where the raw fluid contains air, so that the raw fluid is guided by the guide plate 8 to generate a rotating flow. Accordingly, when air mixed in the raw fluid bubbles and ascends in the raw fluid, the air bubbles float up to the fluid surface with scum, impurities, etc. so that the scum and impurities are removed efficiently. It is a matter of course that oil-water separation in this case is performed in the same manner as described above.

A further embodiment of the oil-water recovering and separating apparatus according to the present invention will be described below with reference to FIGS. 13 through 16. Incidentally, constituent parts the same as or equivalent to those in the aforementioned embodiment are referenced correspondingly.

In this embodiment, the oil-water recovering and separating apparatus 1 is constituted by a raw fluid intake means 2 for taking in the raw fluid recovered, and an outer cylinder 40 provided in the outside of the intake means 2. A flow-in portion 41 is formed between the intake means 2 and the outer cylinder 40. Further, not only a first separation tank 44 and a second separation tank 45 partitioned by partition walls 42 and 43 are provided in the flow-in portion 41, but also inclined surfaces 42a and 43a are formed at upper ends of the partition walls 42 and 43 respectively.

The intake means 2 is constituted by a vertically disposed cylindrical member, and a pipe 46 is provided in the center of the inside of the supply cylinder 2 so as to be erected over the longitudinal direction of the supply cylinder 2. A spiral portion 47 formed from a plate member of stainless steel is provided in a gap between the pipe 46 and the inner surface of the intake means 2 constituted by a cylindrical member. Further, an opening portion 48 is formed in the upper side surface of the intake means 2 and a recovery pipe 49 is attached to the bottom portion of the intake means 2. Further, the recovery pipe 49 is connected to a waste raw fluid feed pump 50.

Next, a vessel 51 filled with a whisker net 25 formed of metal whiskers (fine wires of 30 to 40 microns) such as stainless steel, or the like, in the form of a net is disposed in the intermediate portion of the first separation tank 44. A large number of through pores 52 are formed in the vessel 19. Further, air pipes 28 are disposed under the vessel 19. A large number of through pores (not shown) are formed in each of the air pipes 28.

Incidentally, the surfaces of the whiskers may be acid-pickled to be subjected to satin finish (rough surface finish) in order to enlarge the surface area to thereby make it easy to deposit oil particles on the surfaces. The vessel 51 may be interchangeably provided.

An opening portion 55 is formed in the outer cylinder 40 in the first separation tank 44 side in the lower portion in the neighborhood of the partition wall 42 so as to be communicated with a water reservoir tank 54. Further, a drain tank 57 is formed so as to be adjacent to the water reservoir tank 54 through a partition wall 56. Further, a water reservoir tank 59 is formed so as to be adjacent to the drain tank 57 through a partition wall 58. Further, partition plates 60 for adjusting the fluid levels in the water reservoir tanks 54 and 59 are slidably attached to the partition walls 56 and 58, respectively.

A drain port 62 is formed in the lower portion of the drain tank 57. Further, the water resrvoir tank 59 is communicated with the second separation tank 45 by an opening portion 63 formed in the outer cylinder 40 in the second separation tank 45 side in the lower portion in the neighborhood of the partition wall 43. Further, an oil part recovery portion 17 is provided so as to be adjacent to the second separation tank 45 through the partition wall 43. The oil part recovery portion 17 is formed from a nearly U-shaped oil part recovery portion 64 having a recovery port 64a located so as to be slightly higher in level than the upper portion of the partition wall 43 and a lower portion extended to the outside of the outer cylinder 40.

Next, scrape-up means 22 are disposed in the upper portion of the raw fluid intake means 2 and in the upper portion of the outer cylinder 40 so as to move along the fluid levels a of the raw fluid flowing into the intake means 2 and into the outer cylinder 40. Each of the scrape-up means 22 is composed of a rotation plate 66 formed from resin or metal such as stainless steel, or the like, a rotation shaft 67 fixed to the upper portion of the center of the rotation plate 66, and a large number of scrape-up plates 68 disposed on the lower surface of the rotation plate 66 and formed from resin or metal such as stainless steel, or the like. Further, the rotation shaft 67 is connected to a motor 72.

Support pieces 68a provided on the upper portions of the scrape-up plates 68 respectively are movably pivotally supported on shaft members 71 laid over U-shaped support members 70 which are attached slightly obliquely to the lower surface of the rotation plate 66 by screws 69. Incidentally, the scrape-up means are not always limited to the scrape-up plates 68 and the scrape-up means may be constituted by brushes, clothes, or the like.

According to the oil-water recovering and separating apparatus 1 configured as described above, when an oil-water mixed raw fluid is supplied from the lower portion of the intake means 2 by the feed pump 50, the raw fluid is separated on the basis of difference in specific gravity while the raw fluid floats up slowly along the rear surface of the spiral portion 47. In this occasion, light oil is deposited on the rear surface of the spiral portion 47 and roughened in terms of particle size while floating up gradually to thereby increase the buoyancy of the light oil and form condensed oil. The condensed oil overflows into the flow-in portion 41 from the opening portion 48 in the upper portion of the intake means 2. Further, the position of the fluid level a of the thus flowing-in raw fluid rises gradually and becomes constant when the flow-in rate and the flow-out rate are balanced.

Incidentally, not only the oil part but also solid impurities such as scum, foreign matter, etc., are always mixed and floated in the raw fluid. Accordingly, when the motor 72 is operated to rotate the rotation plate 66, the scrape-up plates 68 also move along the fluid level a of the raw fluid flowing into the intake means 2 and into the outer cylinder 40. Accordingly, solid impurities such as scum, foreign matter, etc., contained in the raw fluid are scraped up to the recovery port 64a of the oil part recovery portion 64 by the movement of the scrape-up plates 68 and introduced to the oil part recovery portion 64 so as to be recovered.

On the other hand, an oil part is mixed also in the raw fluid flowing out to the flow-in portion 41. The raw fluid is separated vertically on the basis of difference in specific gravity in the first separation tank 44. When particles of the oil part come into contact with the fine wires of the whisker net 25, the particles of the oil part are deposited on fine wires of the whisker net 25 due to surface tension so that a larger amount of the oil part can be recovered whereas the water part passes as it is through the whisker net 25. Because the oil part is held in the whisker net 25 as described above, the oil part and the water part are hardly mixed with each other even in the case where a more or less flow occurs in the raw fluid. Accordingly, oil-water separating efficiency is good. Incidentally, the oil part deposited on the whisker net 25 is forced to depart from the whisker net 25 so as to float up by air generated from the air pipes 28.

The oil part thus separated overflows into the second separation tank 45 from the upper portion of the partition wall 42 between the first and second separation tanks 44 and 45. In this occasion, not only the separated oil part flows into the second separation tank 45 but also a more or less amount of the water part flows into the second separation tank 45. On the other hand, the water part in the first separation tank 44 flows into the water reservoir tank 54 from the opening portion 55 provided in the lower portion of the outer cylinder 40. Further, the oil part flowing into the second separation tank 45 overflows into the recovery port 64a of the recovery portion 64 from the upper portion of the partition wall 43 so as to be recovered. Further, the water part flowing into the second separation tank 45 flows into the water reservoir tank 59 from the opening portion 63 provided in the lower portion of the outer cylinder 40. The water part flowing into the water reservoir tanks 54 and 59 overflows into the drain tank 57 from the upper portions of the partition walls 56 and 58 provided in the respective tanks, and is discharged from the drain port 62 provided in the lower portion of the drain tank 57. Incidentally, the fluid level can be adjusted by moving up/down the partition plate 60 provided on each of the partition walls 56 and 58.

Oil and water are completely separated from each other by repeating the aforementioned separation, so that not only the oil part is recovered but also floating solid impurities such as scum, foreign matter, etc., are also recovered.

As shown in the aforementioned configuration, according to the feature stated in invention, the oil part is scraped up by the scrape-up plates so that the oil part can be recovered to the opening of the oil part recovery pipe. Of course, solid impurities such as scum, foreign matter, etc., mixed in the oil part can be also recovered.

According to the invention, the raw fluid is insulated from air in oil-water separation based on difference in specific gravity so that the oil part floated up can be prevented from becoming into a state where overflowing becomes difficult due to vaporization of the oil part. Furthermore, a rotating flow of the raw fluid is generated simply by an operation of making the oil-water mixture raw fluid of flow into the separation tank to thereby increase the opportunity of specific gravity difference separation so that the raw fluid can be separated into oil and water efficiently.

According to the invention, the raw fluid is continuously guided by the circular arc surface so that a rotating flow regular and long in the duration thereof can be generated. Furthermore, a rotating flow of the raw fluid is generated simply by an operation of making the oil-water mixture raw fluid flow into the separation tank to thereby increase the opportunity of specific gravity difference separation so that the raw fluid can be separated into oil and water efficiently. Furthermore, the raw fluid is insulated from air in oil-water separation based on difference in specific gravity so that the oil part floated up can be prevented from changing into a state where overflowing becomes difficult due to vaporization of the oil part.

According to the invention, the oil part separated is collected to a high portion of the roof shape by the buoyancy of the oil part so that the oil part can be easily separated.

According to the invention, not only air mixed at the time of taking-in of the raw fluid is removed so that oil-water separation can be performed without any influence of air but also an separating operation may be carried out while air is mixed in the raw fluid so that scum, foreign matter, or the like, can be removed effectively by using the buoyancy of air.

According to the invention, file particles of the oil part in the separation tank or in the water reservoir tank are deposited by using the net so as to grow so that the oil part can be effectively removed.

According to the invention, the fluid level in each of the water reservoir tank and the separation tank can be adjusted accurately.

According to the invention, separation of oil and water can be performed efficiently on the basis of difference in specific gravity simply by making an oil-water mixture fluid flow into the separation tank provided in the flow-in portion. Furthermore, floating solid impurities such as scum, foreign matter, etc., mixed in the oil-water mixture fluid can be scraped up by the scrape-up means so as to be recovered.

According to the invention, not only light oil can be deposited on the rear surface of the spiral portion but also the oil is roughened in particle size while floating up to thereby increase the buoyancy of the oil and form condensed oil so that the condensed oil can be made to flow into the flow-in portion.

Furthermore, according to the invention, particles of the oil part in the oil-water mixture fluid are deposited on the whisker net so as to be held in the whisker net. Accordingly, because the oil part and the water part are hardly mixed with each other even in the case where a more or less flow occurs in the oil-water mixture fluid, oil-water separating efficiency is good. Furthermore, the oil part deposited on the whisker net can be forced to depart from the whisker net so as to float up by air blown from the air pipes into the whisker net.

What is claimed is:

1. An oil-water recovering and separating apparatus for separating a raw fluid consisting of a mixture of oil and water into an oil part and a water part on the basis of a difference in specific gravity, comprising:

intake means for taking in the recovered raw fluid;

a separation tank for separating the taken-in raw fluid that flows into said separation tank from the intake means;

a water-part reservoir tank in communication with said separation tank;

a drain tank in communication with said water-part reservoir tank;

an oil part recovery portion disposed in said separation tank, said oil part recovery portion having a recovery port disposed slightly above the fluid level of the raw fluid in said separation tank;

scrape-up means provided at a position facing said recovery port so as to move along said fluid level;

circular arc-shaped guide means for generating a rotating flow in the taken-in raw fluid, said circular arc-shaped guide means being positioned on a side of said separation tank; and an inclined ceiling attached to said separation tank so that the downstream side in the direction of flow of the raw fluid becomes higher gradually.

2. An oil-water recovering and separating apparatus according to claim 1, comprising a plurality of the circular arc-shaped guide means for generating a rotating flow of the raw fluid, the circular arc-shaped guide means being provided on the side of said separation tank so as to be positioned opposite to each other and displaced vertically from each other.

3. An oil-water recovering and separating apparatus according to claim 2, wherein said inclined ceiling attached to said separation tank is shaped like a single-flow roof or a double-flow roof.

4. An oil-water recovering and separating apparatus according to claim 1, wherein said raw fluid intake means is formed so as to send the received raw fluid mixed with air to said separation tank in a state in which the raw fluid comprises mixed air or in a state in which mixed air has been removed from the raw fluid.

5. An oil-water recovering and separating apparatus according to claim 1, further comprising adjust means for adjusting the fluid level in said water reservoir tank, and the fluid level in said separation tank is provided on a partition wall for partitioning said water reservoir tank and said drain tank.

6. An oil-water recovering and separating apparatus for separating a raw fluid consisting of a mixture of oil and water into an oil part and a water part on the basis of a difference in specific gravity, comprising:

intake means for taking in the recovered raw fluid, said intake means being cylindrical shaped and having a spiral inner portion;

an outer cylinder formed in the outside of said intake means;

a flow-in portion for flowing in the raw fluid formed between said outer cylinder and said intake means;

a separation tank and an oil part recovery portion provided in said flow-in portion, said oil recovery portion including a recovery port which is located so as to be slightly higher than the fluid level of the raw fluid in said separation tank;

a whisker net formed of metal whiskers disposed in said separation tank;

air flowing means disposed so as to blow air into said whisker net;

scrape-up means provided in an upper portion of said intake means and in an upper portion of said outer cylinder so as to move along the fluid level of the raw fluid flowing into said intake means and in said flow-in portion so that floating solid matter and viscous oil part contained in the raw fluid is scraped up to said recovery port by said scrape-up means.

7. An oil-water recovering and separating apparatus for separating a raw fluid consisting of a mixture of oil and water into an oil part and a water part on the basis of a difference in specific gravity, comprising:

an intake that takes in the recovered raw fluid;

a separation tank that separates the taken-in raw fluid that flows into the separation tank from the intake;

a water-part reservoir tank in communication with the separation tank;

a drain tank in communication with the water-part reservoir tank;

an oil part recovery portion disposed in the separation tank, the oil part recovery portion having a recovery port disposed slightly above the fluid level of the raw fluid in the separation tank;

a scraper disposed at a position facing the recovery port so as to move along the fluid level;

a circular arc-shaped guide that generates a rotating flow in the taken-in raw fluid, the circular arc-shaped guide being disposed on a side of the separation tank; and an inclined ceiling attached to the separation tank so that the downstream side in the direction of flow of the raw fluid becomes higher gradually.

8. An oil-water recovering and separating apparatus according to claim 7, comprising a plurality of the circular arc-shaped guides that generate a rotating flow of the raw fluid, the circular arc-shaped guides being disposed on the side of the separation tank so as to be positioned opposite to each other and displaced vertically from each other.

9. An oil-water recovering and separating apparatus according to claim 7, wherein the inclined ceiling attached to the separation tank is shaped like a single-flow roof or a double-flow roof.

10. An oil-water recovering and separating apparatus according to claim 7, wherein the raw fluid intake is formed so as to send the received raw fluid mixed with air to the separation tank in a state in which the raw fluid comprises air or in a state in which mixed air has been removed from the raw fluid.

11. An oil-water recovering and separating apparatus according to claim 7, further comprising an adjuster that adjusts the fluid level in the water reservoir tank, and the fluid level in the separation tank is disposed on a partition wall that partitions the water reservoir tank and the drain tank.

* * * * *